United States Patent [19]

Raudys et al.

[11] 4,197,983

[45] Apr. 15, 1980

[54] HANGER-CLIP CLOSURE FOR CASINGS

[75] Inventors: Vytas A. Raudys; Ronald R. DeVitto, both of Chicago, Ill.

[73] Assignee: Union Carbide Corporation, New York, N.Y.

[21] Appl. No.: 706,353

[22] Filed: Jul. 19, 1976

[51] Int. Cl.² ............................................. B65D 33/30
[52] U.S. Cl. ................................... 229/65; 24/30.5 R
[58] Field of Search ....................... 229/65; 24/30.5 R

[56] References Cited

U.S. PATENT DOCUMENTS

| 2,693,875 | 11/1954 | Chaffee | 229/65 |
| 3,400,433 | 9/1968 | Klenz | 24/30.5 |
| 3,541,647 | 11/1970 | Marietta, Jr. | 24/30.5 |
| 3,575,339 | 4/1971 | Kupcikevicius | 229/54 |
| 3,943,606 | 3/1976 | Ernst | 24/3 R |

Primary Examiner—Stephen P. Garbe
Attorney, Agent, or Firm—Cornelius F. O'Brien

[57] ABSTRACT

A combination end closure and loop hanger for stuffed casings comprising a flexible tape looped with the free ends disposed adjacent to and secured to a gathered end of the casing by a U-shaped clip member. The clip comprises a crown member connecting corresponding ends of two opposed legs and having an internal crown length shorter than the width of the tape so that as the legs are deformed to encircle the gathered casing and free ends of the tape in pressure engagement, the free ends of the tape will be crimped and anchored between said legs.

10 Claims, 10 Drawing Figures

U.S. Patent  Apr. 15, 1980  Sheet 1 of 2  4,197,983
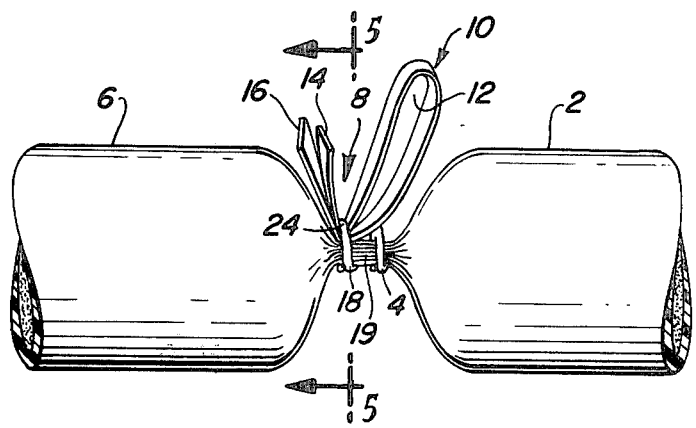
FIG. 1
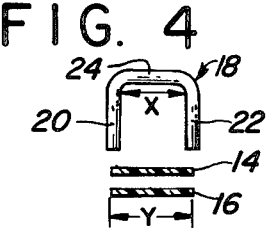
FIG. 4
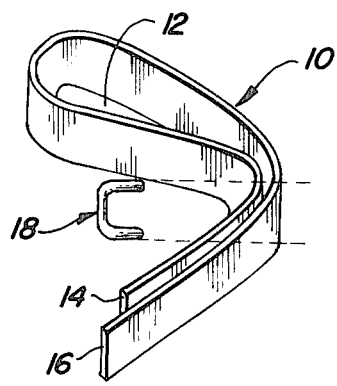
FIG. 3
FIG. 5
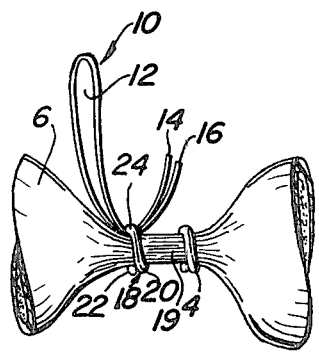
FIG. 6
FIG. 7
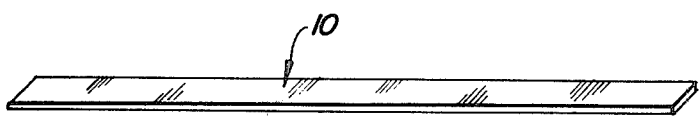
FIG. 2

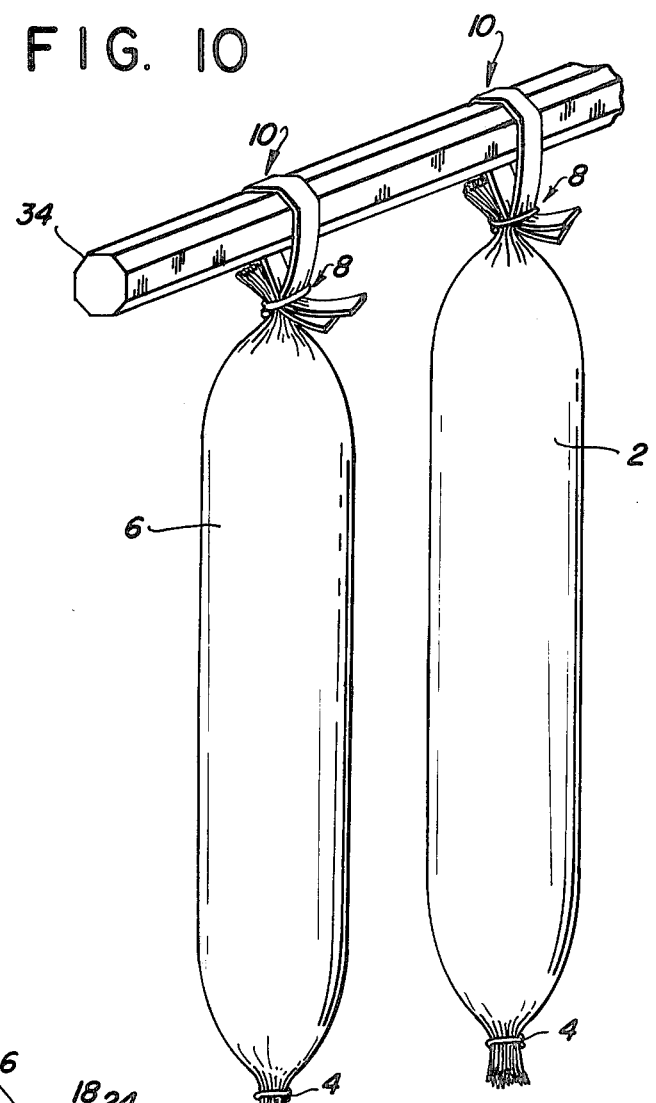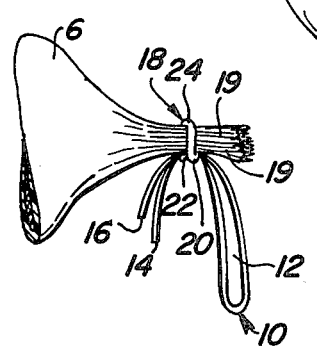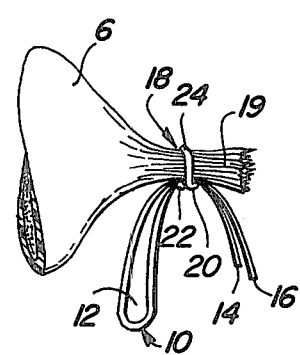

HANGER-CLIP CLOSURE FOR CASINGS

FIELD OF THE INVENTION

The invention relates to a casing, such as a food casing, having a gathered end secured to a combination end closure and loop hanger.

BACKGROUND OF THE PRIOR ART

Food casings of the type that can be used in accordance with this invention are usually stuffed with such food items by the use of mechanical equipment. A first end of the food casing is closed and the open or second end is placed over a horn or outlet means from which the food item is ejected under pressure until the food casing is stuffed. The closed end of the food casing must, therefore, be strong enough to withstand the stuffing pressure and also be sufficiently secured so that no food will escape therefrom during stuffing. The second end of the thusly stuffed food casing is then closed and the encased food product further processed in conventional apparatus, such as cooking ovens, smoke houses and the like, where the stuffed food product is cooked and cured and then stored until ready for use or further processing. In general, one end closure of the casing is provided with a looped hanger, such as stout twine, to suspend the stuffed food casing thereby during the processing and storage period. The looped hanger is usually made as an integral part of the first end casing closure.

In present manufacturing methods, these lengths of cured and cooked food products, which can be over 5 feet in length and weigh more than 40 pounds, are then cut transversely into slices of equal thickness and weight, either before or after removing the food casing therefrom, and are then packaged and sold through retail outlets in today's commercial market places.

In accordance with conventional practice, the first end closure is made on the flattened food casings when they are dry. These food casings are then soaked in water before being stuffed in order to render them more pliable during stuffing. The methods presently employed to close one end of a food casing and provide a hanger loop therefor include the use of string, twine, cupclips and the like as is disclosed in U.S. Pat. Nos. 2,462,957, 2,760,226, 3,565,640, 3,575,339, and 3,943,606. During the soaking of those food casings provided with loops of string or twine, the loops often become knotted and tangled and must be manually unraveled before the casing is stuffed or, in any event, before the stuffed food casing is suspended for subsequent processing, curing and cooking.

Since industry is now tending to demand longer and heavier encased food products, attachment of a suitable suspension means to these food casings is becoming increasingly more important. Obviously, suspension means which tend to damage the casing wall so that the casing breaks or suspension means which break or become separated from the encased food products during handling and processing results in waste.

U.S. Pat. No. 3,575,339 discloses a casing closure comprising a hanger loop having free ends positioned adjacent to a pleated end of the casing and being secured to said pleated end by a resilient wire clip. The free ends of the hanger loop have beads thereon which coact with the resilient wire clip to form an anchoring means for the hanger loop by which the casing can be suspended. Although this casing closure provides an effective loop hanger for casings, it has the disadvantage in that the free ends of the hanger loop have to terminate in beads, nubs, knobs, or the like.

U.S. Pat. No. 3,943,606 discloses a casing loop hanger having an extended stem equipped with one or more nubs or stops which function as anchorage means when engaged with a conventional type U-shaped clip means. Again, the disadvantage of this type of loop hanger is that the extended stem of the hanger member requires nubs or stops as the anchoring means for the loop hanger.

An object of the present invention is to provide a casing with a combination end closure and loop hanger that is economical to make and which is capable of supporting a product within said casing for an extended period of time as, for example, during subsequent processing and handling.

Another object of the present invention is to provide a food casing with a combination end closure and loop hanger that is capable of supporting an encased food product for extended periods of time during subsequent processing, cooking and curing and which enables the encased food product to be easily handled during processing and in transit.

Another object of the present invention is to provide a loop hanger which is so constructed that its application to a food casing will not damage the casing wall or yield to conditions during processing and handling.

SUMMARY OF THE INVENTION

The invention broadly relates to a casing having one end gathered and secured to a combination end closure and loop hanger comprising a strip of tape looped with at least one free end positioned adjacent to and longitudinally aligned with the gathered end of the casing and secured thereat with a U-shaped clip having a pair of opposed legs and a crown connecting said corresponding end of said legs with the internal length of the crown being smaller than the width of at least one of the free ends of the tape and said clip legs being bent to ovally encircle said gathered casing end and said at least one free end of the tape in pressure engagement such that said at least one free end of the tape is crimped between said legs thereby securing said tape loop hanger to the gathered end of the casing so that said loop is readily available for grasping and/or hanging the casing.

Specifically, the hanger-closure of this invention is made of a deformable flexible type material wider than the inside crown of a preformed U-shaped clip. The tape is first preformed with an open loop with two extended free ends and then bent and positioned so as to curl outwardly from a gathered casing end at the point where the U-shaped clip is to be fastened. The legs of the clip are then deformed into encircling pressure engagement about the gathered casing end and the tape free ends with a sufficiently high radially inwardly directed compressive force to produce a leak free closure thereat. Since the width of the tape is wider than the inside length of the crown of the clip, then the free ends of the tape are crimped between the legs of the clip thereby firmly anchoring the tape to the gathered end of the casing. In addition, the extended free ends of the hanger tape are preferably curled in a direction away from the casing surface so as not to puncture or otherwise damage the casing. The wide open loop of the tape closure so formed can be readily manipulated onto hanging means for processing; is readily adjustable to conform to the hanging means; distributes the weight of the product to the gathered casing end; maintains holding power throughout a wide temperature range and when the casing contains food, such as bologna, salami and the like, it prevents pronating of the stuffed casing during processing.

The term "casing" as employed throughout this application and in the appended claims is intended to include, but not be restrictive of, those tubular food casings fabricated from such materials as collagen, cellulose, regenerated cellulose, cellulose having fibers embedded therein, polyvinyl chloride, polypropylene, polyethylene, polyvinylidene chloride, and the like. These food casings are also known by those skilled in the art as "sausage casings" and are generally employed as containers or molds into which is stuffed or encased a food item, such as raw meat emulsions, meat chunks, discrete meat cuts, and the like. These encased food items can then be frozen or, if desired, processed, as by cooking and curing, and items such as salami and bologna sausages, spiced meat loaves, ham loaves, hams, and the like, can be obtained.

In addition, the term "casing" is intended to include, but not be restrictive of, flexible bags fabricated from such materials as cloth, plastics, netting or the like, or two or more of these flexible materials which are suitable for gathering together to form a neck-like extension onto which the tape loop hanger can be secured. For example, an article may be packaged in a plastic bag and then placed in a netting which could be gathered at the open end to form an extended neck onto which the tape loop hanger could be secured in accordance with this invention.

The material of the tape loop hanger could be selected from such materials as metal tape, filament tape, plastic tape such as polyester, polypropylene, nylon or the like.

The material employed to form the clip is not critical and can be selected from such materials as aluminum, plastics, steel, metallic alloys and the like, provided the materials are capable of being suitably formed into and function in a manner similar to that described herein. Similarly, the cross-sectional configuration of the clip wires employed is also not critical and clip wires having circular, oval, U-shaped, triangular, square or rectangular cross sections and the like can be readily employed.

An important requirement of this invention is that the width of the tape be wider than the internal length of the crown of the clip so that when the legs of the clip are deformed to encircle the tape and the gathered section of a casing, the legs will forcibly squeeze and crimp the tape into a secured anchored engagement. To provide a sufficient crimping of the tape between the legs of the clip, the width of the tape should be about 5 to 25% wider than the internal length of the crown of the clip and preferably be about 10% wider. By adjusting the degree of crimping of the tape within the clip, the loop hanger of this invention could sustain weights up to and above 50 pounds.

BRIEF DESCRIPTION OF THE DRAWINGS

FIG. 1 is a perspective view of a hanger-clip-closure of the invention applied to one end of a stuffed casing;

FIG. 2 is a perspective view of a length of flexible tape before forming into a hanger;

FIG. 3 is a perspective view of the tape of FIG. 2 formed into an open loop and performed with a bent portion, and a U-shaped clip aligned for engaging the tape at the bent area;

FIG. 4 is a sectional view showing the relationship of the width of the tape to the internal dimension of the clip before closing;

FIG. 5 is a cross section taken along line 5—5 of FIG. 1 showing the tape secured to the gathered casing by the closed clip;

FIG. 6 is a sectional view similar to FIG. 4 of an alternate embodiment of a clip;

FIG. 7 is an alternate embodiment of FIG. 1;

FIG. 8 is an alternate embodiment of FIG. 1 with the looped tape secured adjacent the closed legs of the clip;

FIG. 9 is an alternate embodiment of FIG. 8; and

FIG. 10 is a perspective view of hanger-clip-closure articles suspended from a common rod.

DETAILED DESCRIPTION

In FIG. 1 there is shown a leading article stuffed casing 2 having its trailing end closed by clip 4. Adjacent and trailing article stuffed casing 2 is an article stuffed casing 6 having its leading end closed with a hanger-clip-closure 8 and its trailing end (not shown) closed with a clip similar to clip 4. As shown in FIGS. 1, 2 and 3, hanger-clip-closure 8 comprises a flexible tape 10 of uniform cross section (FIG. 2) which is preformed into a loop 12 having extended free ends 14, 16, said loop and free ends 14, 16 being defined with respect to the positioning of said clip 18 about said tape 10 as shown in FIGS. 1 and 3. The preformed tape 10 is positioned adjacent the gathered neck portion 19 of article stuffed casing 6 such that the free ends 14–16 curl radially outwardly from the surface of the casing so as to prevent the corners of the free ends 14, 16 from contacting, puncturing or otherwise damaging the casing. Preferably, free end 16 should extend beyond free end 14 of preformed tape 10 so as to shield the casing 6 from the corners of free end 14 as generally shown in FIG. 1.

A U-shaped clip 18 as shown in FIGS. 1, 3 and 4 has a pair of opposed legs 20–22 and a crown 24 connecting the corresponding end of said legs 20–22. The internal length of crown 24, designated as X, is less than the width, designated as Y, of the free ends 14, 16 of tape 10 as shown in FIG. 4. As stated above, the length Y should be at least about 5% larger than length X to insure that the free ends 14, 16 of tape 10 will be sufficiently crimped between legs 20, 22 so that the loop will be securely anchored within said clip 18 and thereby be able to sustain a relatively heavy article encased member without the free ends 14, 16 slipping through clip 10.

As shown in FIG. 5, the legs 20, 22 are deformed so as to ovally encircle the gathered end portion 19 of casing 6 and free ends 14, 16 in a pressure engagement such that the free ends 14, 16 of tape 10 are squeezed, necked down and crimped between legs 20, 22 thereby anchoring the necked portion of loop tape 10 within said clip 18 and to said gathered end portion 19 of casing 6.

FIG. 6 shows a variation in the clip member 26 in that the opposed legs 28, 30 are extended outward so as to facilitate the initial positioning of clip 26 onto and about the free ends 14, 16 of tape 10 and the gathered end portion 19 of casing 6. Once the clip 26 is in position, the extended legs 28, 30 are deformed as described in conjunction with FIG. 5. As also described in conjunction with FIG. 4, the internal length X' of crown 32 has to be smaller than the width Y of free ends 14, 16 so as to properly secure tape 10 within said clip 26.

FIG. 7 shows an alternate embodiment of the hanger-clip-closure of FIG. 1 in that the free ends 14, 16 of loop hanger tape 10 are oriented such that they straddle the end gathered portion 19 while the loop 12 is positioned proximal the ungathered (stuffed) portion of casing 6. In this embodiment, the likelihood of the pointed corners of free ends 14, 16 of tape 10 which could damage the stuffed casing is greatly reduced.

As shown in FIGS. 1 and 7, the free ends 14, 16 of tape 10 in the assembled state are positioned adjacent the crown 24 of clip 18 with the legs 20, 22 encircling and adjacent to the gathered end portion 19 of casing 6. The loop hanger tape 10 could be disposed on the opposite side of the gathered casing 6 so that the free ends 14, 16 of tape 10 are encircled by and adjacent to the legs 20, 22 of clip 18 as shown in FIG. 8 which corresponds to the loop hanger arrangement shown in FIG. 1, and FIG. 9 which corresponds to the loop hanger arrangement shown in FIG. 7.

Once the stuffed casing 6 is severed from the connected stuffed casing 2, the stuffed casings 2 and 6 can be suspended from a conventional rod 34 in a close spacing arrangement as shown in FIG. 10. Thus the hanger-clip-closure of this invention is ideally suited for use with stuffed food casings which have to be processed and cured by depending them from rods in conventional type smokehouses. In addition, the hanger-clip-closure of this invention will provide an excellent gripping means for handling and conveying stuffed articles from and to different localities.

It is also within the scope of this invention to have one of the free ends of the tape folded upon and secured to an opposite segment of the tape to form a loop terminated with only one extended free end, said free end having a width wider than the internal length of the crown of the clip so that it can be squeezed and crimped within the clip as described above.

EXAMPLE

Each of several 4.66 inch (11.8 centimeters) diameter casings, clip-closed at one end, was filled with food product and then closed with a hanger-clip-closure as shown in FIG. 1. The hanger tape of sanitary flexible plastic was approximately 8 inches (20.3 centimeters) long and preformed to form a loop approximately 2.5 inches (6.4 centimeters) long when flattened and having extended free ends, one of which was approximately 1.125 inches (2.86 centimeters) long and the other 1.25 inches (3.17 centimeters) long. The tape was deformed as shown in FIG. 3 and then using a wire clip the preformed tape was secured to the gathered end of the casing. Each of the stuffed casings measuring five feet (152 centimeters) long and weighing about 30 pounds was then grasped by the loop portion of the tape and positioned in a close spacing arrangement on a rod in a smokehouse where the food product was processed. The processed stuffed casings were then removed and no difficulty was encountered in their handling either prior to processing or subsequent to processing.

It should be understood that the foregoing disclosure relates to preferred embodiments of the invention and it is intended to cover all changes and modifications of the invention which do not depart from the spirit and scope of the appended claims.

What is claimed is:

1. A casing having one end gathered and secured to a combination end closure and loop hanger comprising a strip of tape looped with at least one free end positioned adjacent to and longitudinally aligned with the gathered end of the casing and secured thereat with a U-shaped clip having a pair of opposed legs and a crown connecting said corresponding end of said legs with the internal length of the crown being smaller than the width of said at least one free end of the tape, and wherein said clip legs being bent to ovally encircle said gathered casing end and said at least one free end of the tape in pressure engagement such that said at least one free end of the tape is disposed adjacent to the crown of the clip and crimped and secured between said legs thereby securing said tape loop hanger to the gathered end of the casing so that said loop is readily available for grasping and/or hanging the casing.

2. The casing of claim 1 wherein said tape has two free ends which are crimped between the legs of the clip.

3. The casing of claim 2 wherein the free ends of the looped tape are disposed proximal the end portion of the gathered end portion of the casing and the looped portion of the tape is disposed proximal the ungathered portion of the casing.

4. The casing of claim 2 wherein the looped portion of the tape is disposed proximal the end portion of the gathered end of the casing and the free ends of the looped tape are disposed proximal the ungathered portion of the casing.

5. The casing of claim 2 wherein the width of the free ends of the looped tape are at least about 5% wider than the internal length of the crown of the clip.

6. The casing of claim 2 wherein the innermost disposed free end of the tape with respect to the closed clip extends beyond the outwardly disposed free end.

7. The casing of claim 6 wherein the width of the free ends of the looped tape are at least about 5% wider than the internal length of the crown of the clip.

8. The casing of claim 2 wherein the free ends of the looped tape are curled outwardly away from the casing.

9. The casing of claim 8 wherein the looped portion of the tape is disposed proximal the end portion of the gathered end of the casing and the free ends of the looped tape are disposed proximal the ungathered portion of the casing.

10. The casing of claim 8 wherein the width of the free ends of the looped tape are at least about 5% wider than the internal length of the crown of the clip.

* * * * *